United States Patent
Sato et al.

(10) Patent No.: US 11,340,196 B2
(45) Date of Patent: May 24, 2022

(54) ONLINE CRACK DETECTION DEVICE FOR ROLLING ROLL, ROLLING ROLL, AND ONLINE CRACK DETECTION METHOD FOR ROLLING ROLL

(71) Applicant: HITACHI METALS, LTD., Tokyo (JP)

(72) Inventors: Keishi Sato, Tokyo (JP); Masahiko Ohshima, Kitakyusyu (JP); Toshiyuki Hattori, Kitakyusyu (JP); Tomohisa Hemmi, Tokyo (JP); Masaaki Tsuji, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 6 days.

(21) Appl. No.: 16/771,553

(22) PCT Filed: Dec. 14, 2018

(86) PCT No.: PCT/JP2018/046033
§ 371 (c)(1),
(2) Date: Jun. 10, 2020

(87) PCT Pub. No.: WO2019/124237
PCT Pub. Date: Jun. 27, 2019

(65) Prior Publication Data
US 2020/0309740 A1    Oct. 1, 2020

(30) Foreign Application Priority Data

Dec. 21, 2017 (JP) .............................. JP2017-244577

(51) Int. Cl.
*G01N 29/14* (2006.01)
*B21B 38/00* (2006.01)
*G01N 29/44* (2006.01)

(52) U.S. Cl.
CPC ............. *G01N 29/14* (2013.01); *B21B 38/00* (2013.01); *G01N 29/4463* (2013.01)

(58) Field of Classification Search
CPC .... G01N 29/14; G01N 29/4463; B21B 38/00; B21B 27/02; B21B 2203/18; B21C 51/00
See application file for complete search history.

(56) References Cited

U.S. PATENT DOCUMENTS 4,884,449 A * 12/1989 Nishimoto ............. G01N 29/14
                                                          73/660
10,247,599 B2 * 4/2019 Takahashi .............. G01H 17/00
(Continued)

FOREIGN PATENT DOCUMENTS

JP    55-096448 A    7/1980
JP    55-124064 A    9/1980
(Continued)

OTHER PUBLICATIONS

International Search Report and English Translation, PCT/JP2018/046033 dated Feb. 26, 2019, 4 pgs.
(Continued)

*Primary Examiner* — Xin Y Zhong
(74) *Attorney, Agent, or Firm* — Volpe Koenig

(57) ABSTRACT

A crack detection device performs online identification of the occurrence and propagation of a crack in the surface of the barrel portion of a rolling roll. A rolling roll is provided with the crack detection function without any substantial modification of the rolling device and without any continuous disposition of multiple sensors in the rolling roll. The detection device is incorporated in a rolling device having a barrel portion and shaft portions extending as a unit from both ends of the barrel portion and includes the rolling roll where an AE sensor detecting elastic waves generated on a surface of the barrel portion and a calculation unit calculating a feature value of the elastic waves detected by the AE (Continued)

sensor are disposed in at least one of the shaft portions and a discrimination unit discriminating, from the feature value, elastic waves attributable to a crack occurring in the barrel surface.

16 Claims, 9 Drawing Sheets

(56) References Cited

U.S. PATENT DOCUMENTS

| | | | | |
|---|---|---|---|---|
| 10,288,475 | B2* | 5/2019 | Araki | G01M 99/00 |
| 2002/0116980 | A1* | 8/2002 | Kerr | G01N 29/4463 |
| | | | | 73/1.14 |
| 2016/0327444 | A1 | 11/2016 | Ichikawa et al. | |
| 2017/0052149 | A1* | 2/2017 | Aura | G01N 29/14 |
| 2017/0310345 | A1 | 10/2017 | Kitayoshi et al. | |

FOREIGN PATENT DOCUMENTS

| | | |
|---|---|---|
| JP | 60-252255 A | 12/1985 |
| JP | 61-196160 A | 8/1986 |
| JP | 02-090057 A | 3/1990 |
| JP | 2002-277421 A | 9/2002 |
| JP | 2006-226731 A | 8/2006 |
| JP | 2012-21791 A | 2/2012 |
| JP | 2017-007029 A | 1/2017 |
| JP | 2017-135840 A | 8/2017 |
| WO | 2015/108152 A1 | 7/2015 |
| WO | 2016/060065 A1 | 4/2016 |

OTHER PUBLICATIONS

Extended European Search Report dated Aug. 24, 2021 for European Patent Application No. 18891382.6.

* cited by examiner

F I G. 2
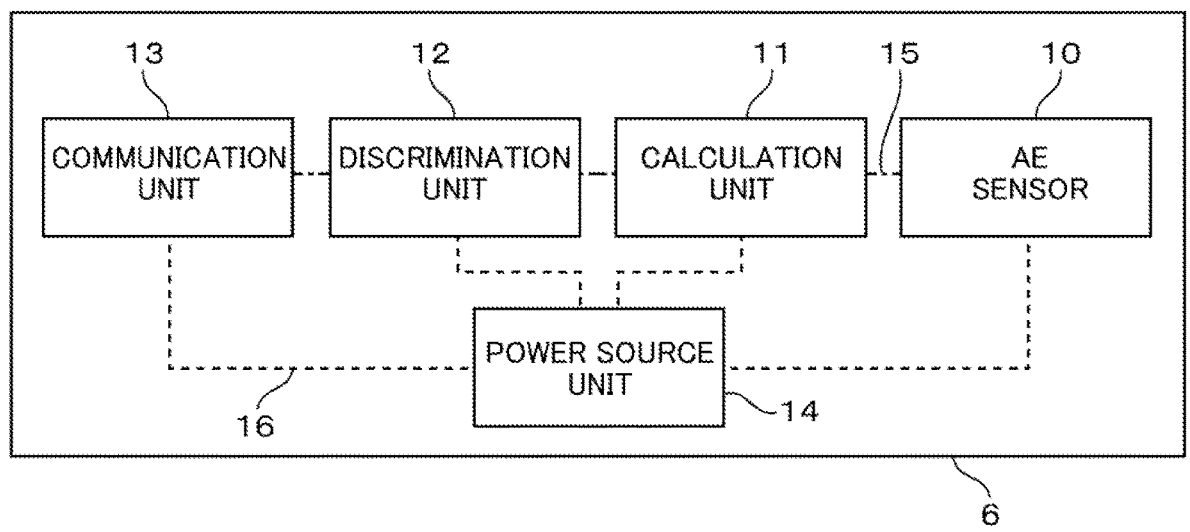

ONLINE CRACK DETECTION DEVICE FOR ROLLING ROLL, ROLLING ROLL, AND ONLINE CRACK DETECTION METHOD FOR ROLLING ROLL

TECHNICAL FIELD

The present invention relates to a technique for detecting a crack defect in or directly below the surface of a rolling roll by means of a sensor disposed in the rolling roll and, more particularly, to a rolling roll having a crack detection function and a crack detection device detecting a crack online and by means of a sensor disposed in the roll for rolling after the crack occurs and propagates in or directly below the surface of the rolling roll while a steel sheet is rolled by the rolling roll being rotated by a rolling device, that is, in a rolling process.

BACKGROUND ART

In the field of hot rolling of steel sheets, techniques for detecting a crack defect in and/or directly below the surface of the body portion of a rolling roll (hereinafter, barrel surface) by means of a sensor such as an ultrasonic flaw detector, an eddy current flaw detector, and an acoustic emission (hereinafter, AE) sensor have been developed.

The background of the need for the crack defect detection techniques will be described. In a steel sheet hot rolling process, a slab manufactured by continuous casting or the like and having a thickness of several tens of millimeters to approximately 300 mm is heated in a heating furnace and rolled by a rough rolling mill and a finishing rolling mill. Formed as a result is a steel sheet having a thickness of approximately 1 mm to several millimeters. Usually, five- to seven-stand quadruple rolling mills are disposed in series and continuously in the finish rolling mill and a seven-stand finishing rolling mill is widely used. In the case of a five- to seven-stand four-high or six-high rolling mill, the first to fourth stands are referred to as front stands and the fifth to seventh stands are referred to as rear stands.

In a rolling mill, a plurality of pairs of upper and lower rolling rolls are used for steel sheet rolling. This rolling roll is required to have toughness capable of resisting the bending of a rolling load and resistance to wear, a rough surface, a thermal crack, and so on, and a mono-block rolling roll or a roll for rolling having a composite structure has been used in the related art. The former is made of ductile cast iron, adamite cast iron, cast steel, forged steel, or the like. An outer layer and an inner layer are integrated by metal bonding in the latter. The outer layer is made of high-chromium cast iron, grain cast iron, and a high-speed alloy excellent in wear resistance or rough surface resistance. The inner layer is made of forged steel or ductile cast iron excellent in toughness.

Although the rolling roll having the composite structure is mainly used in finishing rolling, so-called cobble, which is a rolling accident, may occur and the probability of the cobble accident is higher in the rear stands. The cobble arises when the sheets of two steel sheets are stacked for various reasons between the rolling stands and rolled by the rolling rolls with the sheets stacked. Accordingly, a rolling roll for rear stands of a finishing rolling mill is required to be more impact-resistant than a roll for front stands. When the cobble accident occurs and a steel sheet increased in apparent thickness due to double stacking is introduced into a rolling mill, an excessively large contact pressure is locally generated between the steel sheet and the rolling roll and so-called sticking, which is welding of a part of the steel sheet to the barrel surface of the roll, occurs.

When a rolling roll is used for rolling with the sticking present, an excessively large contact pressure is continuously received from a backup roll or a steel sheet, and then the propagation of a crack into the roll is rapidly accelerated. A part of the roll body portion undergoes spalling destruction in the case of a substantial crack propagation in the roll. The spalling destruction results in a long-term rolling mill operation interruption for rolling mill restoration, and the interruption results in production loss costs. A reliable online detection of the occurrence and propagation of a crack in the roll barrel surface is required for rolling roll spalling destruction prevention.

In the related art, the following prior art has been disclosed as exemplary methods for detecting a crack in a rolling roll.

A method for detecting a crack in a rolling mill sleeve roll is described in Patent Document 1. According to this method, a magnetic sensor is attached to an end portion of the surface of the rolling mill sleeve roll, a frequency of 1.5 kHz to 2.5 kHz is applied to the magnetic sensor, an output signal from the magnetic sensor is processed, and a crack in the axial direction of the rolling roll is detected as a result. However, it is difficult to detect a crack that occurs in the entire surface of the roll by the crack detection method of Patent Document 1 since the magnetic sensor is attached to the surface end portion. In addition, multiple magnetic sensors need to be continuously attached along the axial direction of the roll, which leads to a complicated device configuration, for the crack that occurs in the entire surface of the roll to be detected. In addition, a complicated rolling equipment configuration arises as the magnetic sensor needs to be attached to a support arm provided on a roll chock via a cushioning material such as a leaf spring.

Patent Document 2 describes an online and ultrasonic flaw detection method for a roll for rolling. According to Patent Document 2, a roll shaft portion has an accommodation hole for accommodating an ultrasonic probe extending inward from an end face of the roll shaft portion coaxially with the rotation axis of the roll, one side of a shaft body is accommodated in the accommodation hole with the ultrasonic probe arranged, an ultrasonic wave from the ultrasonic probe is incident and propagated from the inner surface of the accommodation hole toward the surface of the outer layer of the roll, a reflected wave from a crack in the body portion surface of the roll outer layer is received, and the crack is detected as a result. Although a plurality of the ultrasonic probes are axially disposed according to the crack detection method of Patent Document 2, an ultrasonic flaw detector is capable of detecting no cracks outside an ultrasonic oscillation path, and thus multiple ultrasonic flaw detectors need to be axially and continuously installed, which leads to a complicated device configuration, for a crack to be detected in the entire surface of the body portion of the roll for rolling. In addition, the shaft portion needs to be hollow over the entire body portion of the roll for rolling, and thus the strength reliability of the roll for rolling declines and use for steel sheet rolling is not easy.

Meanwhile, Patent Document 3 discloses a system in which an AE sensor detects a delayed destruction in which a crack occurring in a rolling roll propagate during roll storage to cause destruction. For an early determination of the presence or absence of the possibility of the propagation of the crack, the presence or absence of an AE wave is detected by the AE sensor of the system mounted on a shaft portion end face, by the roll being heated by an external heating body and thermal stress being used as a load, and the delayed destruction of the roll for rolling is inspected as a result. However, although the present inventor attempted to detect a crack occurring during steel sheet rolling by mounting an AE sensor in the shaft portion end portion of the rolling roll and disposing the rolling roll in a rolling device as described in Patent Document 3, it was difficult to detect only an elastic wave entailed by a crack occurring in the surface of the rolling roll as the AE wave generated during steel sheet pressurization by the rolling roll became noise during the rolling.

CITATION LIST

Patent Document

Patent Document 1: JP 60-252255 A
Patent Document 2: JP 2012-21791 A
Patent Document 3: JP 2002-277421 A

SUMMARY OF THE INVENTION

Problems to be Solved by the Invention

Accordingly, an object of the present invention is to solve the above-mentioned problems of the related art and provide a crack detection device for a rolling roll capable of performing online detection of the occurrence and propagation of a crack in the barrel surface of a rolling roll and a rolling roll used for the device without any substantial modification of a rolling device or the rolling roll and without any continuous disposition of multiple sensors in the rolling roll. Another object of the present invention is to provide a crack detection method for a rolling roll by which the occurrence and propagation of a crack in the barrel surface of the rolling roll can be detected online.

Solutions to Problems

In order to respond to the above-mentioned problems of the related art, the present inventor has intensively studied a voltage signal and has reached the present invention. The voltage signal is detected by an AE sensor being disposed in a shaft portion of a roll for rolling and detecting an elastic wave generated from the barrel surface the rolling roll during rolling work.

In other words, an online crack detection device for a rolling roll mounted in a rolling device of the present invention with the rolling roll having a barrel portion and shaft portions extending as a unit from both ends of the barrel portion includes an AE sensor detecting an elastic wave generated on a barrel surface, a calculation unit calculating a feature value of the elastic wave detected by the AE sensor, and a discrimination unit discriminating, from the feature value, an elastic wave attributable to a crack occurring in the barrel surface.

Preferably, in the online crack detection device for a roll for rolling of the present invention, the calculation unit receives the elastic wave generated in the barrel of the rolling roll with the AE sensor as a voltage signal, a filtered signal is generated by an unnecessary frequency being removed by filtering of the voltage signal, and the filtered signal is converted into a digital signal after quantization, the feature value of the elastic wave is calculated from the digital signal, and the discrimination unit discriminates the elastic wave attributable to the crack occurring in the barrel surface by removing, based on the feature value of the elastic wave calculated by the calculation unit, an elastic wave attributable to friction between the rolling roll and a steel sheet at a time when the rolling roll rolls the steel sheet and an elastic wave at a time when the rolling roll bites the steel sheet.

Preferably, in the online crack detection device for a rolling roll of the present invention, an elastic wave with a rise time of 20 μsec or more is removed as the elastic wave attributable to the friction with the steel sheet, the rise time being the feature value of the elastic wave.

Preferably, in the online crack detection device for a rolling roll of the present invention, the steel sheet biting time from time-series data of a load current applied to the rolling device should be identified, then remove the elastic wave synchronizing to this detected time regarding as the elastic wave at a time of steel sheet biting.

Preferably, in the online crack detection device for a rolling roll of the present invention, an elastic wave having the same cycle as a rotation cycle of the rolling roll is discriminated as the elastic wave generated by the crack in the barrel surface.

In a rolling roll provided in the online crack detection device for a rolling roll of the present invention, the AE sensor is in at least one of the shaft portions of the rolling roll. In addition, it is preferable that the calculation unit is disposed in at least one of the shaft portions of the rolling roll in the rolling roll of the present invention.

Preferably, in the rolling roll provided in the online crack detection device for a rolling roll of the present invention, a communication unit transmitting the feature value of the elastic wave calculated by the calculation unit to an outside of the rolling roll is disposed in at least one of the shaft portions of the rolling roll. In addition, in the rolling roll provided in the online crack detection device for a rolling roll of the present invention, it is preferable that a discrimination unit discriminating the elastic wave attributable to the crack from the feature value of the elastic wave calculated by the calculation unit and a communication unit transmitting information resulting from the discrimination to an outside of the rolling roll are disposed in at least one of the shaft portions of the rolling roll.

Preferably, in the rolling roll provided in the online crack detection device for a rolling roll of the present invention, a power source unit for supplying electric power to the AE sensor, the calculation unit, and the communication unit or the AE sensor, the calculation unit, the discrimination unit, and the communication unit is disposed in at least one of the shaft portions of the rolling roll.

Preferably, in the rolling roll provided in the online crack detection device for a rolling roll of the present invention, a recess portion for disposing the AE sensor, the calculation unit, the communication unit, and the power source unit or the AE sensor, the calculation unit, the communication unit, the discrimination unit, and the power source unit is provided in an end portion of the shaft portion.

Preferably, in the rolling roll provided in the online crack detection device for a rolling roll of the present invention, an acceleration sensor detecting the number of rotations of the rolling roll is disposed in the rolling roll.

Preferably, in the online crack detection device for a rolling roll of the present invention, the power source unit for supplying electric power to the AE sensor, the calculation unit, the discrimination unit, and the communication unit is disposed outside the rolling roll.

Preferably, in the online crack detection device for a rolling roll of the present invention, a power receiving unit incorporating a power receiving coil disposed on an outer periphery of the shaft portion of the rolling roll and a power transmission unit incorporating a power transmission coil disposed so as to face the power receiving unit are magnetically coupled and non-contact power supply is performed to the power receiving unit via the power transmission unit from the power source unit disposed outside the rolling roll.

An online crack detection method for a rolling roll of the present invention includes detecting, with an AE sensor, an elastic wave generated on a barrel surface of a rolling roll having the barrel portion and shaft portions extending as a unit from both ends of the barrel portion, calculating a feature value of the elastic wave detected by the AE sensor, and discriminating, from the feature value, an elastic wave attributable to a crack occurring in the barrel surface.

Preferably, in the online crack detection method for a rolling roll of the present invention, the elastic wave generated in the barrel of the rolling roll is received as a voltage signal by the AE sensor, a filtered signal is generated by an unnecessary frequency being removed by filtering of the voltage signal, the filtered signal is converted into a digital signal after quantization, the feature value of the elastic wave is calculated from the digital signal, and the elastic wave attributable to the crack occurring in the barrel surface is discriminated by an elastic wave attributable to friction between the rolling roll and a steel sheet at a time when the roll for rolling rolls the steel sheet and an elastic wave at a time when the roll for rolling bites the steel sheet being removed based on the feature value of the elastic wave.

Effects of the Invention

With the present invention, it is possible to perform online detection of the occurrence and progress of a crack in the barrel surface of a rolling roll, without any substantial change in the shape of the rolling roll and without any continuous disposition of multiple sensors in the rolling roll, during rolling device operation. As a result, it is possible to forestall a rolling roll breakage accident during the operation of the rolling roll.

BRIEF DESCRIPTION OF THE DRAWINGS

FIG. 2 is a drawing illustrating a functional block diagram of a crack detection unit disposed in a rolling roll in the first embodiment of the present invention.

MODE FOR CARRYING OUT THE INVENTION

Embodiments of the present invention will be described in detail. The present invention is not limited to the following embodiments, and modifications and improvements appropriately made to the following embodiments based on the ordinary knowledge of those skilled in the art and without departing from the technical idea of the present invention are also included in the scope of the present invention.

First Embodiment

Hereinafter, an online crack detection device for a rolling roll and a rolling roll of a first embodiment of the present invention will be described with reference to FIGS. 1 to 9A and 9B.

Figure 1:
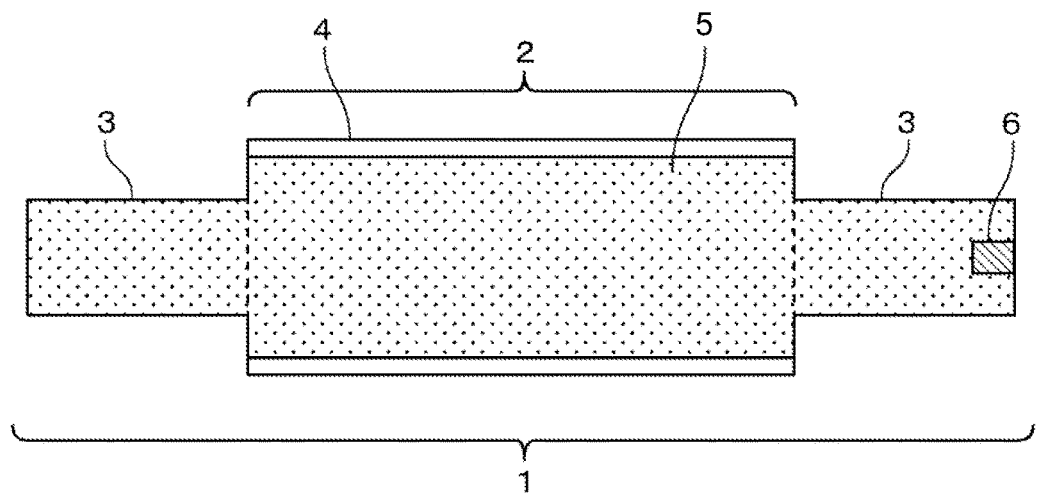
FIG. 1 is a drawing illustrating the disposition of an online crack detection device for a rolling roll in a first embodiment of the present invention.

FIG. 1 is a drawing illustrating the disposition of the rolling roll and the online crack detection device for a rolling roll in the first embodiment of the present invention. In FIG. 1, a rolling roll 1 has a body portion 2 for rolling a steel sheet and shaft portions 3 extending as a unit from the barrel portion for supporting the rolling roll with a bearing (not illustrated). The barrel portion 2 is a composite structure in which an outer layer 4 and an inner layer 5 are integrated by metal bonding. An online crack detection unit 6 in which an AE sensor, a calculation unit, and a discrimination unit are disposed is disposed in one shaft portion of the rolling roll.

FIG. 2 is a drawing illustrating a functional block diagram of the crack detection unit 6 disposed in the rolling roll in the first embodiment of the present invention. Provided are an AE sensor 10 detecting the elastic wave that is generated on the barrel surface 2 and a calculation unit 11 calculating the feature value of the elastic wave detected by the AE sensor 10. Further provided in the first embodiment is a discrimination unit 12 discriminating the elastic wave that is attributable to a crack occurring in the barrel surface from the feature value.

In the calculation unit 11, the elastic wave generated in the body portion of the rolling roll is received as a voltage signal by the AE sensor 10 disposed in the shaft portion and a filtered signal is generated by an unnecessary frequency being removed from the voltage signal by filtering by means of a bandpass filter (BPF) or the like. The unnecessary frequency is selected in accordance with a measurement object. In the case of metal, an elastic wave having a frequency component of approximately 100 kHz to 500 kHz is released, and thus another frequency may not be required. The filtered signal is converted into a digital signal after quantization by means of an analog/digital converter (ADC), and the feature values of the elastic wave are calculated from the digital signal. The feature values of the elastic wave are indices digitizing the feature of the digital signal waveform. Specifically, the feature values are amplitude, rise time, AE energy, and count number.

Applicable as the AE sensor is a sensor using a piezoelectric material highly sensitive in a high frequency band of 10 kHz to 1 MHz. It should be noted that the AE sensor may be of any type, examples of which include a resonance-type AE sensor having a resonance point in a frequency range and a resonance-suppressed broadband-type AE sensor. In addition, a signal amplifier may be incorporated in the housing of the AE sensor. The received elastic wave may be converted into an analog signal by any conversion method, examples of which include a voltage output-type method, a resistance change-type method, and a capacitance-type method. Applicable as the calculation unit is, for example, an electronic circuit board configured by a bandpass filter (BPF), an analog-digital converter (ADC), and a field-programmable gate array (FPGA).

Figure 3:
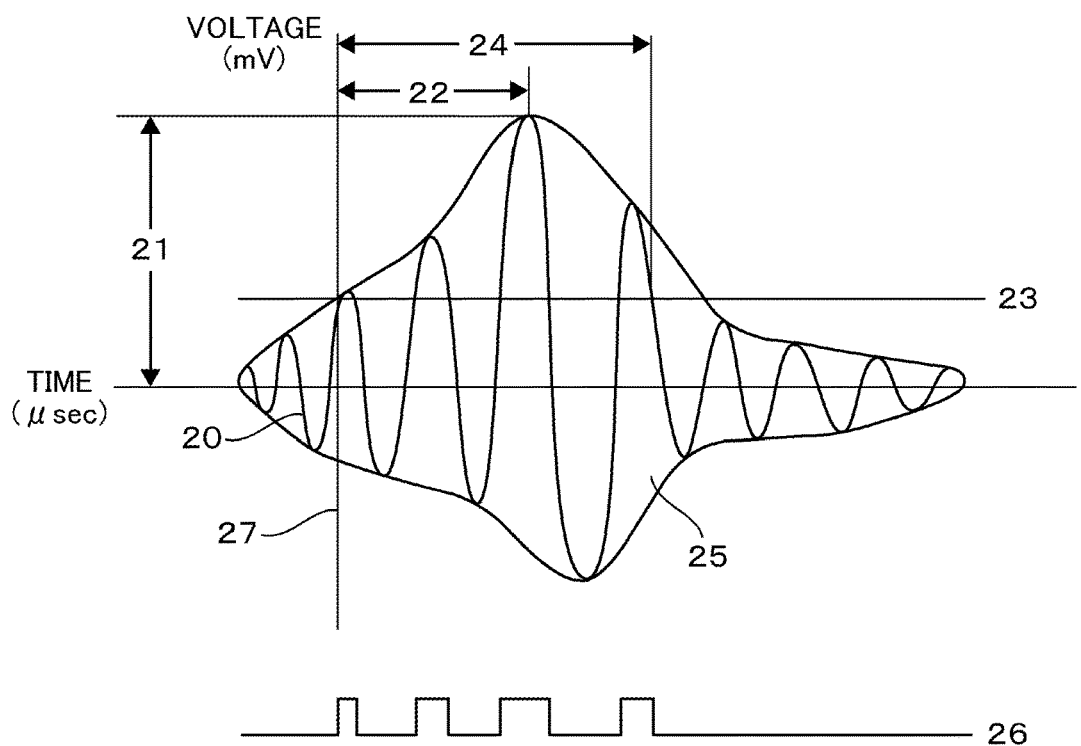
FIG. 3 illustrates a diagram schematically illustrating a digital signal waveform 20 obtained by a calculation unit filtering and quantizing a voltage signal output from an AE sensor that received an elastic wave in the first embodiment of the present invention.

FIG. 3 is a drawing illustrating the feature values of the elastic wave in the first embodiment of the present invention. FIG. 3 schematically illustrates a digital signal waveform 20 obtained by the calculation unit filtering and quantizing the voltage signal output from the AE sensor that received the elastic wave. The following feature values are calculated with respect to this digital signal waveform. An amplitude 21 is the value of the maximum amplitude (unit: mV) in the elastic wave. A rise time 22 is the time (unit: μsec) until the amplitude reaches the maximum amplitude from the zero value by exceeding a preset threshold value 23. It should be noted that the threshold value 23 is set by rewriting of the calculation parameter of the FPGA of the calculation unit 11 and erroneous detection attributable to electric noise or weak vibration is cut and data capacity compression can be performed by the threshold value 23 being increased. However, it is necessary to set the threshold value 23 such that the elastic wave of the crack is not cut and the threshold value 23 is set to, for example, 23.4 mV. A duration 24 is the time (unit: msec) until the amplitude falls below the preset threshold value 23 after rise initiation. An AE energy 25 is the square root (RMS) (unit: decibel second (dBs)) of the value obtained by time integration of the square of the amplitude at each time point. A count number 26 is the number of times the elastic wave exceeded the threshold value 23. In addition, an elastic wave detection time 27 is the time when the amplitude exceeds the threshold value 23.

Although, as for the voltage signal detected during rolling work by the AE sensor 10 disposed in the shaft portion, it was difficult to discriminate only the elastic wave entailed by the crack occurring in the surface of the rolling roll because the elastic wave generated during steel sheet pressurization by the rolling roll become noise, the present inventor found that it is possible to discriminate only the elastic wave attributable to the crack occurring in the barrel surface of the rolling roll among the elastic waves, with the online crack detection device for a rolling roll in the first embodiment, by calculating the feature value by means of the calculation unit 11, based on this feature value, distinguish the voltage signal detected by the AE sensor into the three types, the elastic wave attributable to the crack occurring in the barrel surface, the elastic wave by friction between the rolling roll and the steel sheet, and the elastic wave by the initial steel sheet biting into the rolling rolls. This will be described in detail with reference to FIGS. 4 to 7.

Figure 4:
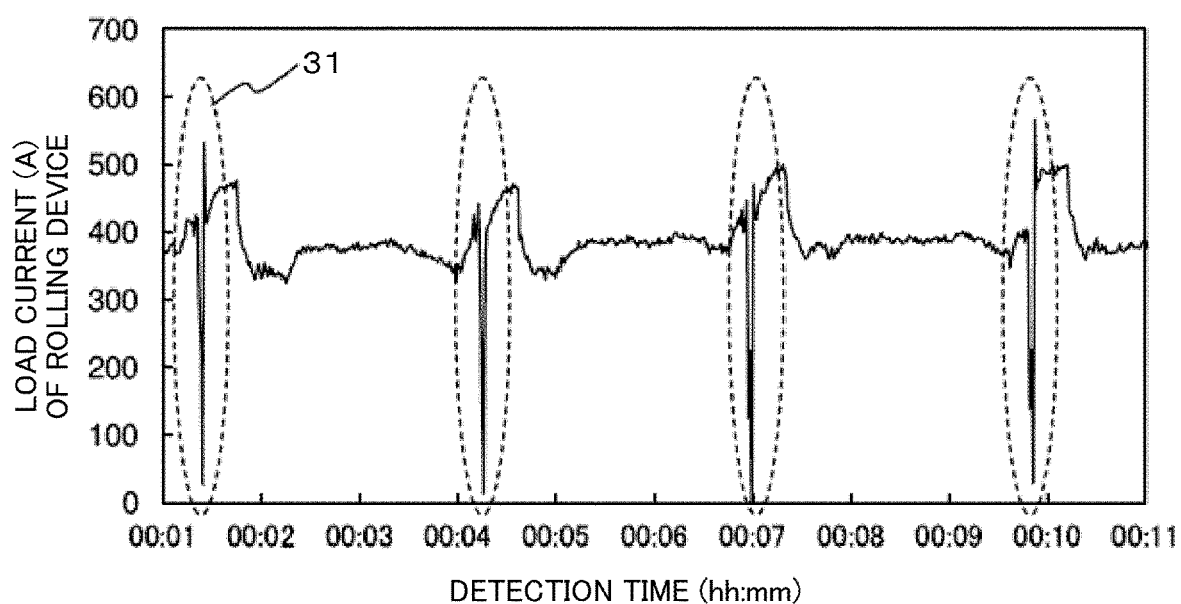
FIG. 4 illustrates the time-series transition of the load current of a rolling device of a rolling process in the first embodiment of the present invention.

FIG. 4 illustrates the time-series transition of the load current of a rolling device in which the barrel portion 2 of the rolling roll has a barrel diameter of 310 mm, the barrel portion has a length of 500 mm, the outer layer has a thickness of 40 mm, the shaft portion 3 of the rolling roll has a diameter of 150 mm and a total length of 1,835 mm, composite high-speed steel roll composed of high-speed steel alloy as the outer layer, and cast steel as the inner layer, and a steel sheet of precipitation hardening stainless steel ASL350 was rolled at a roll rotation speed of 60 rpm. A steep change point 31 of the load current is regularly generated at intervals of approximately three minutes. This is because, when the steel sheet passing through the rolling roll is discharged and the load is eliminated (load current is several tens of A or less), the subsequent steel sheet is bitten at the next moment, the load increases (load current exceeds 500 A), and the load fluctuates at the moment of steel sheet switching and biting and it is possible to determine the timing of steel sheet biting from the load current.

Figure 5:
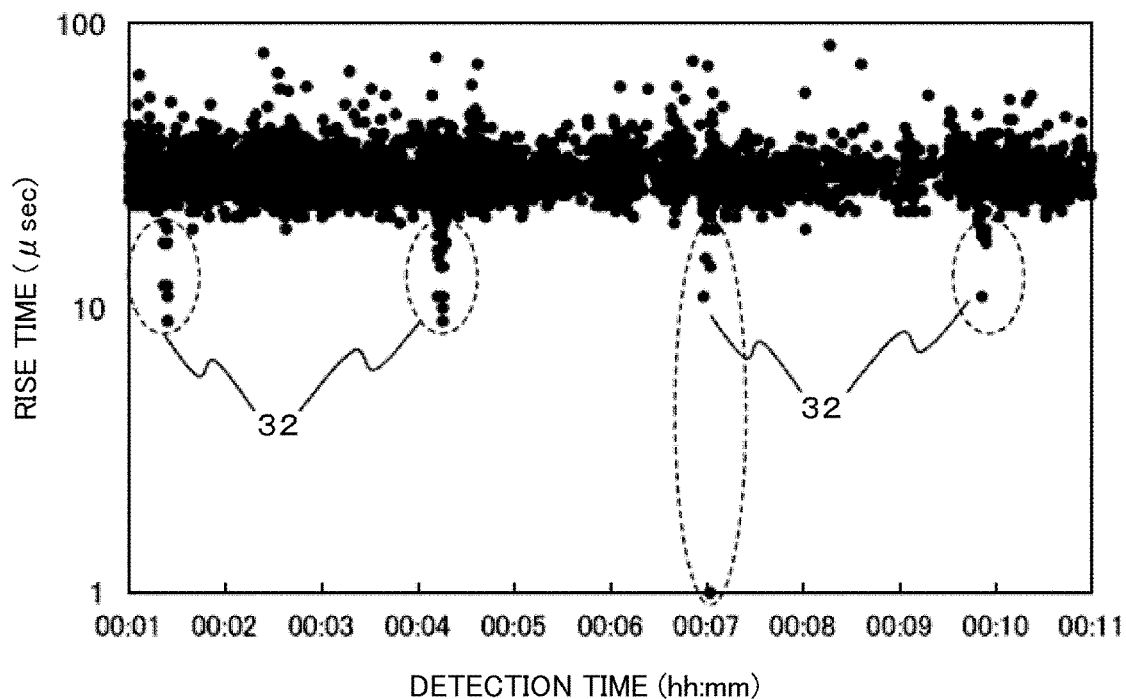
FIG. 5 illustrates the time-series transition of an elastic wave detected in the rolling process in the first embodiment of the present invention.

Illustrated in FIG. 5 is the result of elastic wave detection at a time of rolling under the same conditions as in FIG. 4 and by means of the AE sensor disposed in the end portion of the shaft portion of the rolling roll. Summarized in FIG. 5 is the relationship between the time of elastic wave detection and the rise time as one of the feature values of the elastic wave. An elastic wave having a rise time of less than 20 μsec is regularly detected at intervals of approximately 3 minutes, and thus the rise time corresponds to the steep change point of the load current illustrated in FIG. 4, that is, the time of steel sheet biting and this elastic wave with a rise time of less than 20 μsec can be determined as an elastic wave 32 at the time of steel sheet biting. On the other hand, an elastic wave with a rise time of 20 to 80 μsec is constantly generated during the rolling of the steel sheet and can be determined as an elastic wave entailed by the friction between the rolling roll and the steel sheet.

Figure 6:
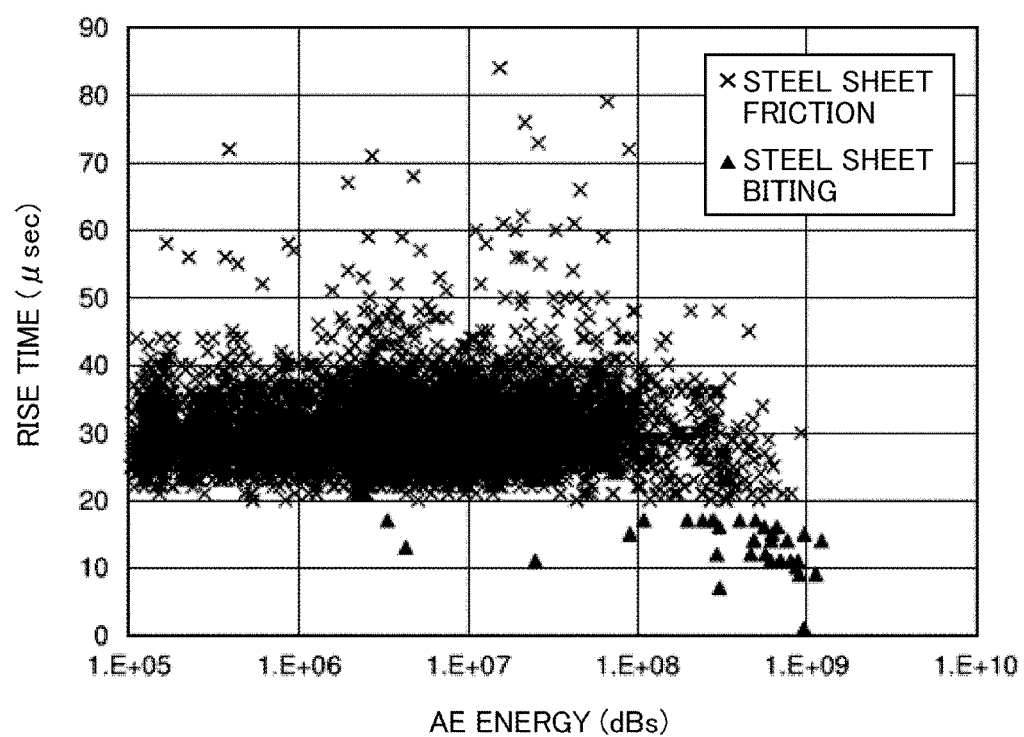
FIG. 6 illustrates an example of the result of elastic wave detection during steel sheet friction and steel sheet biting in the first embodiment of the present invention.

Summarized in FIG. 6 is the relationship between the rise time and the AE energy, which is one of the feature values of the elastic wave, regarding the elastic waves during the steel plate biting and steel sheet friction illustrated in FIG. 5. The AE energy of the elastic wave during steel sheet biting (rise time: less than 20 μsec) exists at $1 \times 10^6$ to $10^{10}$ dBs and is particularly concentrated between $1 \times 10^8$ to $10^9$ dBs. The AE energy of the elastic wave during steel sheet friction (rise time being 20 to 80 μsec) is a wide value of the order of $1 \times 10^5$ to $10^9$ dBs.

Figure 7:
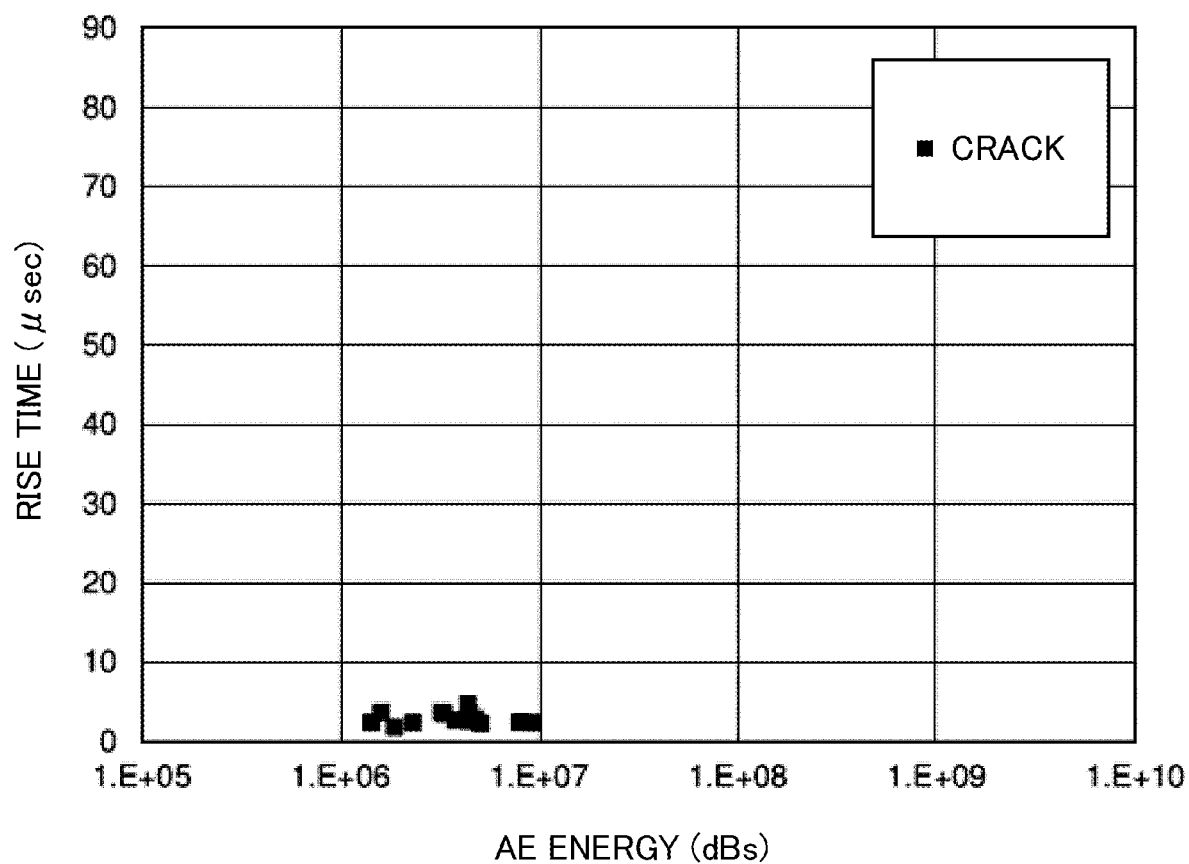
FIG. 7 illustrates an example of the result of crack elastic wave detection in the first embodiment of the present invention.

Illustrated in FIG. 7 is the result of elastic wave detection at a time when a crack was artificially generated by spot welding with the rolling roll at rest, in which the barrel portion 2 of the rolling roll has a barrel diameter of 530 mm, the barrel portion has a length of 1,800 mm, the outer layer of the barrel portion has a thickness of 36 mm, the shaft portion 3 of the rolling roll has a diameter of 200 mm and a total length of 5,000 mm, a high-speed steel alloy is used for the outer layer, and a composite high-speed roll made of ductile cast iron is used for the inner layer. As in FIG. 6, the relationship between the rise time and the elastic energy in the feature values of the elastic wave is summarized in FIG. 7. The elastic wave entailed by the crack was approximately $1 \times 10^6$ to $10^7$ dBs in AE energy and 10 μsec or less, approximately 5 μsec, in rise time.

Accordingly, when attention is paid to the AE energy and the rise time of the elastic wave, the elastic wave at a time of steel sheet friction has a long rise time and can be identified with a threshold value of 20 μsec. On the other hand, the elastic wave at a time of steel sheet biting and the elastic wave of the crack may be approximate in terms of AE energy and rise time. However, as described above, the elastic wave at a time of steel sheet biting corresponds to the steep change point of the load current of the rolling roll, and thus the elastic wave can be distinguished from the elastic wave entailed by the crack.

Figure 8:
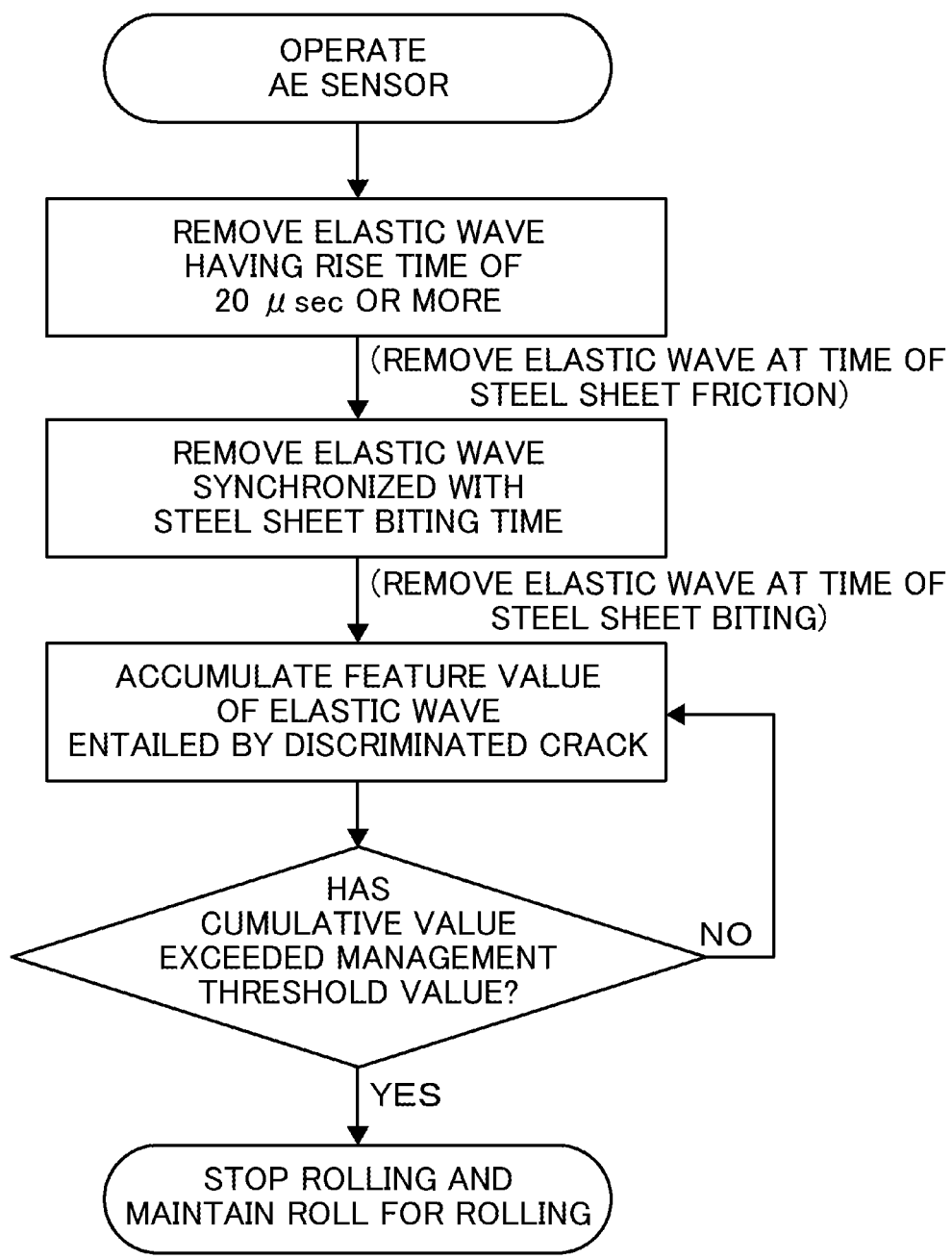
FIG. 8 illustrates a flow of discrimination between an elastic wave entailed by a crack and noise entailed by rolling in the first embodiment of the present invention.

Illustrated in FIG. 8 is a flow of discrimination between the elastic wave entailed by a crack and noise entailed by rolling in the first embodiment of the present invention. At rolling initiation, the AE sensor is operated and the elastic wave during rolling work is detected. With respect to the detected elastic wave group, the calculation unit removes the elastic wave with a rise time of 20 µsec or more as an elastic wave attributable to friction with the steel sheet, and extracts the elastic wave with a rise time of less than 20 µsec. With respect to the extracted elastic wave and based on the time of steel sheet biting from the load current of the rolling device, the elastic wave synchronized with the time of steel sheet biting is removed and the elastic wave not synchronized with the time of steel sheet biting is further extracted. As a result, it is possible to discriminate only the elastic wave attributable to the crack that occurs and propagate in the body portion surface. Further, the occurrence of a crack and the progress of the crack that occurred are monitored by accumulation of any one or a combination of two or more of the count number, energy, amplitude, and root mean square (RMS) of the amplitude of the elastic wave attributable to the crack. The propagated length of the crack can be monitored online from the cumulative value of the feature value and, in a case where the cumulative value of the feature value of the elastic wave entailed by the crack, that is, the propagated length of the crack exceeds a management value requiring refurbishment, the rolling is immediately stopped and the rolling roll is maintained. For example, the count number of the elastic waves attributable to the crack is accumulated and managed.

The discrimination unit is not particularly limited insofar as the discrimination unit has a calculation function to accumulate feature value data of the detected elastic waves and compare the feature value data. A microcomputer or the like can be applied as the discrimination unit.

According to the online crack detection device for a rolling roll, the rolling roll, and the online crack detection method for a rolling roll in the first embodiment of the present invention, a crack that occurs and propagate in the surface of the barrel portion of the rolling roll can be discriminated online. As a result, the rolling process is appropriately stopped, the rolling roll in which a crack occurred is removed from the rolling device, the rolling roll is replaced with an uncracked sound rolling roll, and the rolling process is resumed. The cracked rolling roll is repaired by offline barrel surface removal grinding. As a result, roll breakage attributable to spalling can be forestalled. In addition, a crack in a state where the crack did not significantly propagate can be grasped, and thus grinding amount and repair cost reduction can be achieved.

In the online crack detection device for a rolling roll of the present invention, the elastic wave entailed by the crack propagation in the barrel surface of the rolling roll is generated at the same cycle as the rotation cycle of the rolling roll. For example, in a case where the number of rotations of the rolling roll is 60 rpm, the elastic wave is generated at the same cycle as the rotation cycle (1 s). Accordingly, it is possible to identify steel sheet biting and the elastic wave of the crack with higher precision and discriminate only the elastic wave attributable to the crack with more reliability by using the information of the load current of the rolling device and the number of rotations of the rolling roll and analyzing the elastic wave detection time in time series.

In the rolling roll provided in the online crack detection device for a rolling roll in the first embodiment of the present invention, the discrimination unit discriminating the elastic wave attributable to the crack from the feature value of the elastic wave calculated by the calculation unit and a communication unit transmitting the discriminated information to the outside of the roll for rolling are disposed in at least one of the shaft portions of the rolling roll. The communication unit may be any communication unit capable of wirelessly communicating the information discriminated by the discrimination unit 12 to the outside of the rolling roll. For example, a 2.4 GHz band ZigBee module can be applied. In addition, a communication module corresponding to WiFi, Bluetooth (registered trademark), EnOcean, or specific low power (Wi-SUN) can be appropriately selected in accordance with communication distance requirements. The information transmitted from the communication unit is accumulated in a server outside the rolling roll and used as an index for monitoring whether the rolling roll cracked or whether a crack progressed to an irreparable length.

The rolling roll that constitutes the online crack detection device for a rolling roll in the first embodiment of the present invention has a power source unit for electric power supply to the AE sensor, the calculation unit, the discrimination unit, and the communication unit. A lithium-ion secondary battery or the like can be applied as the power source unit. It should be noted that a function to operate the AE sensor only when the roll rotated during rolling may be provided for battery capacity saving. For example, the function is to perform energization only in a case where a certain centrifugal force is applied with the rotation of the rolling roll by means of a MEMS acceleration sensor-based motion switch or mechanical switch.

A more specific example of the mounting form will be described with reference to FIGS. 9A and 9B.

Figure 9A:
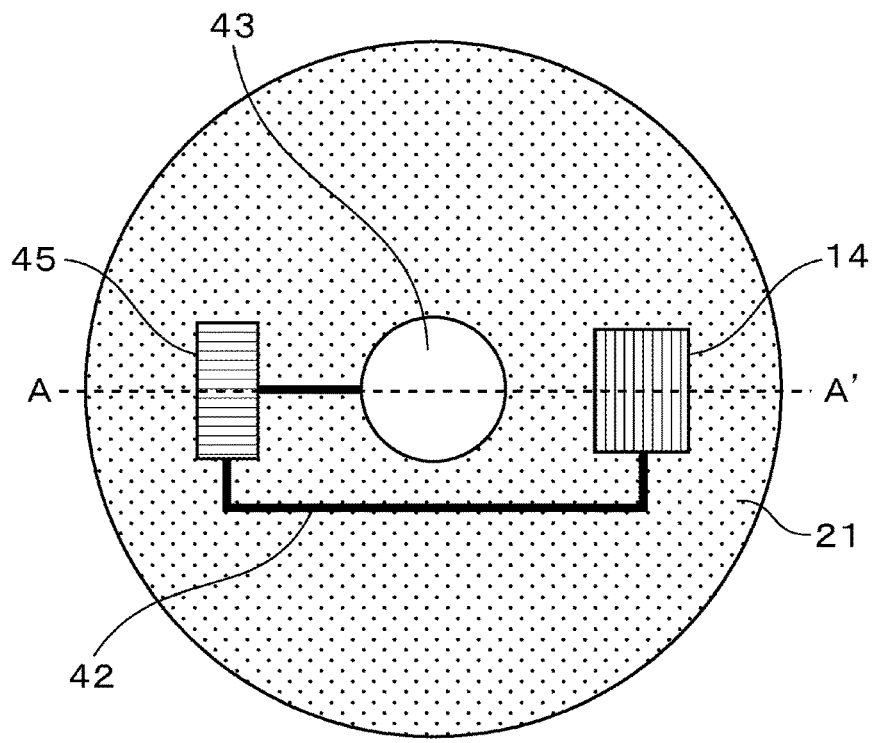
FIGS. 9A and 9B are an end view and an axially parallel cross-sectional view of a shaft portion of the rolling roll, which are related to a case where a lithium-ion secondary battery is used for a power source unit in the crack detection device in the first embodiment of the present invention.

FIG. 9A illustrates an end view and an axially parallel A-A' cross section 9B of the end portion of the shaft portion 3 of the rolling roll regarding the mounting form of the crack detection device in the first embodiment of the present invention. The rolling roll is an example of a composite high-speed steel roll in which the body portion 2 of the roll for rolling has a barrel diameter of 800 mm and the shaft portion 3 of the roll for rolling has a diameter of 400 mm and a total length of 5,000 mm. As illustrated in FIGS. 9A and 9B, a recess portion is provided in the end portion of the shaft portion 3 and the AE sensor 10, a calculation device 45 incorporating the calculation unit, the discrimination unit, and the communication unit, and a power source unit 14 are disposed in this recess portion. It is desirable that the AE sensor 10 is on a side close to the rotation center of the roll for rolling and closer to the barrel portion than the calculation unit and the power source unit in order to detect an elastic wave generated on the surface of the barrel portion of the rolling roll directly and not by means of an attenuating interface echo. Accordingly, a recess portion having an inner diameter of 30 mm and a depth of 260 mm from the end surface of the shaft portion was provided in the back portion of a center hole 43 provided for machining of the rolling roll in the shaft portion end surface of the rolling roll and disposition was performed on the bottom surface of the recess portion. A voltage output-type piezoelectric sensor having a diameter of 20 mm and a height of 25 mm was used as the AE sensor and the end surface that is the detection surface of the AE sensor was disposed and fixed so as to come into contact with the bottom surface of the recess portion. In addition, a silicone resin as an acoustic coupler was applied to the contact interface between the AE sensor end surface and the recess portion bottom surface so that elastic wave transmission from the rolling roll to the AE sensor is improved. As for the fixing of the AE sensor, for example, a pressing jig 41 (set screw having a diameter of 20 mm and a length of 175 mm) pressing the AE sensor was used and a part of the contact portion between a screw thread and the rolling roll was welded by welding after screwing. Further, wiring 42 connecting the AE sensor and the calculation unit was laid at the center of the pressing jig 41. It should be noted that the pressing jig 41 is not particularly limited insofar as the pressing jig 41 can be mounted with high strength for a long period of time and an adhesive or the like as well as the set screw is applicable.

Figure 10A:
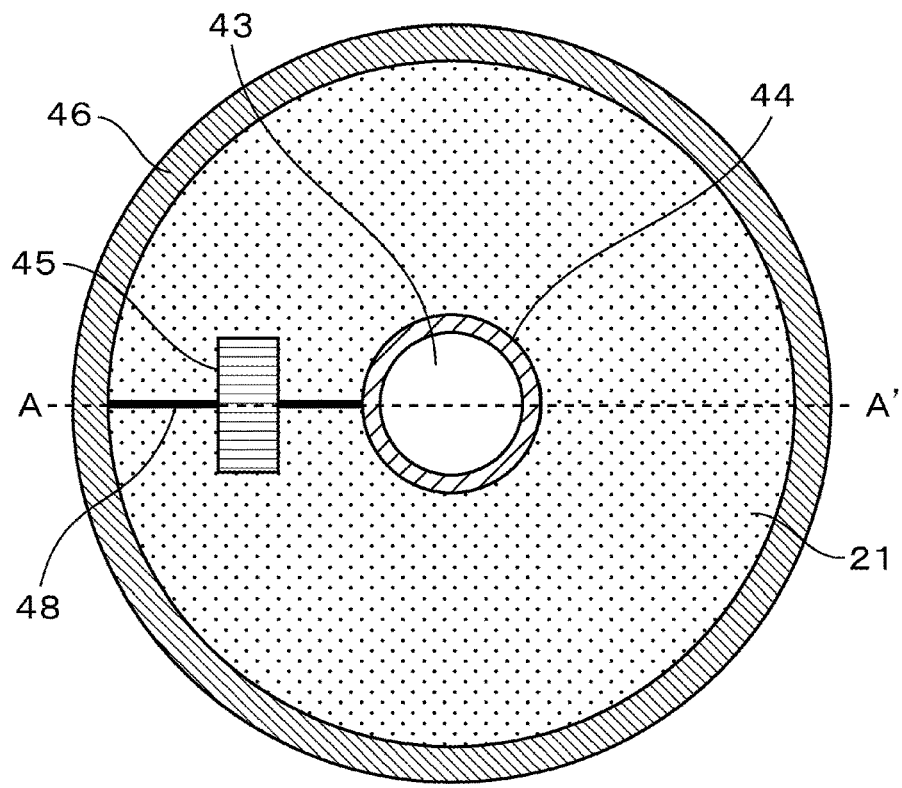
FIGS. 10A and 10B are an end view and an axially parallel cross-sectional view of the shaft portion of the rolling roll, which are related to a case where a magnetic field coupling-type power receiving unit is used for the power source unit in the crack detection device in a third embodiment of the present invention.
Figure 10B:
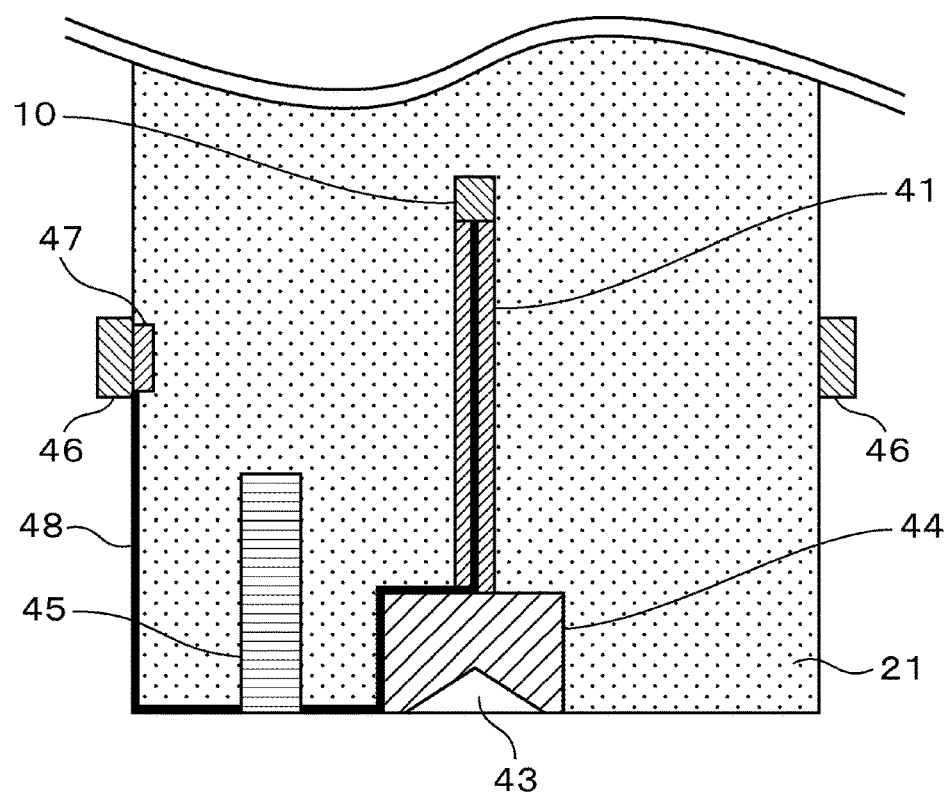

It should be noted that a center hole member 44 in which the center hole 43 is formed may be installed so that the wiring 42 connected to the calculation device 45 from the AE sensor 10 is easily laid. FIG. 10A is an end view and FIG. 10B is an axially parallel A-A' cross-sectional view of the end portion of the shaft portion 3 of the roll for rolling regarding another mounting form of the crack detection device in the first embodiment of the present invention. The center hole member 44 has a circumferential portion where a screw thread is formed as in the case of the pressing jig 41 and a part of the contact portion between the screw thread and the rolling roll can be welded by welding after screwing to the rolling roll. The dimensions of the center hole member 44 are, for example, 100 mm in diameter and 60 mm in length.

The calculation device 45 incorporating the calculation unit, the discrimination unit, and the communication unit was used as the calculation unit and the calculation unit was disposed at a position at a radial distance of 95 mm from the central axis of the end surface of the shaft portion of the rolling roll. An FPGA including a BPF that performs filtering at 20 kHz to 500 kHz, an ADC that performs A/D conversion at 14 bits, and an AlteraMAXII was used as the calculation device 45 incorporating the calculation unit, the discrimination unit, and the communication unit. The FPGA includes a function of a discrimination unit discriminating an elastic wave of a crack. A 2.4 GHz band ZigBee module was used for the communication unit incorporated in the calculation unit. The external shape of the calculation unit was 30 mm in thickness, 70 mm in width, and 125 mm in length, and a recess portion corresponding to this shape was formed and stored in the shaft portion end surface. The calculation unit, the discrimination unit, and the communication unit may be disposed on the shaft portion end surface without the recess portion being provided.

In addition, it is preferable that an acceleration sensor detecting the number of rotations of the rolling roll is disposed in at least one of the shaft portions of the rolling roll provided in the calculation unit of the crack detection device in the first embodiment of the present invention. It is preferable that the calculation device incorporates a MEMS acceleration sensor and has a function of supplying electric power to the calculation unit from the power source unit 14 (described later) only when a centrifugal force is applied to the acceleration sensor by the rotation of the roll for rolling.

The power source unit 14 was disposed at a position at a radial distance of 85 mm from the central axis of the end surface of the shaft portion of the rolling roll and in a diagonal direction with respect to the calculation device 45. A lithium-ion secondary battery in which 18,650 cells are arranged in two series and four parallel was used for the power source unit 14, the external shape was 45 mm in thickness, 56 mm in width, and 175 mm in length, and a recess portion corresponding to this shape was formed and stored in the shaft portion end surface. The wiring 42 connecting the power source unit 14 and the calculation unit was provided. The wiring 42 was laid in the recessed groove having a width of 5 m and a depth of 5 mm and formed on the end surface of the roll for rolling and fixed by means of an adhesive. The recess portion provided in the shaft portion end portion where the crack detection unit mounted in the above-described form is disposed is within a range of 260 mm, and thus there is no problem as to a decrease in the strength of the rolling roll. Although the depth of the recess portion provided in the shaft portion end portion depends on the inner diameter of the recess portion, there is no problem as to a decrease in the strength of the shaft portion, even when the depth is 1,000 mm, when the inner diameter is, for example, 30 mm. Accordingly, the recess portion may have an inner diameter of 10 to 30 mm or 100 to 1,000 mm.

Second Embodiment

Figure 12:
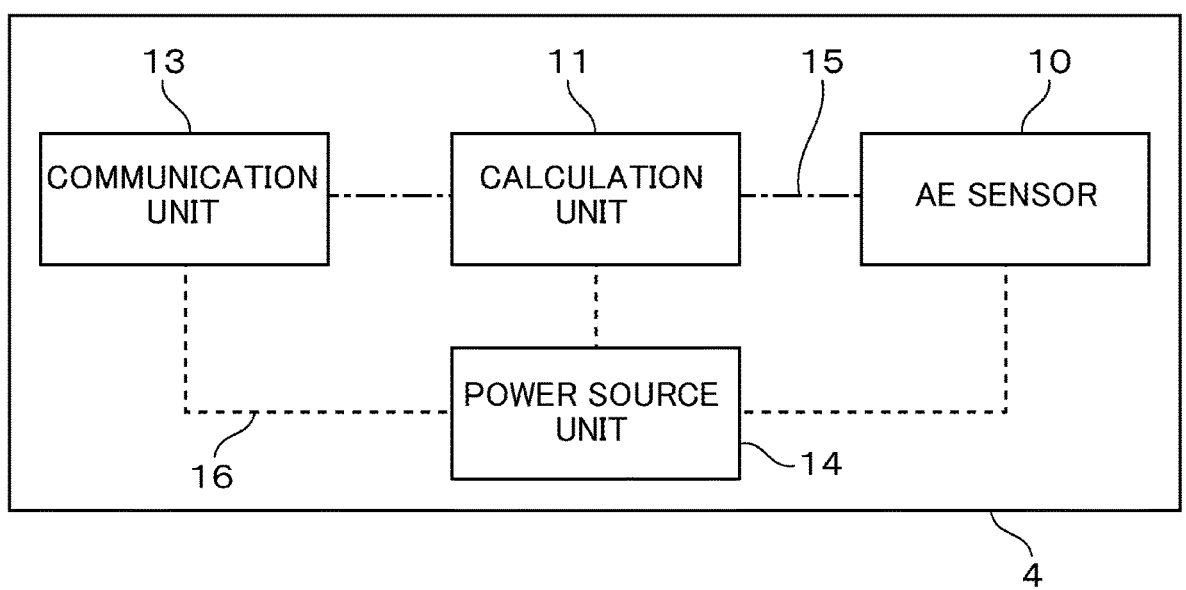
FIG. 12 is a drawing illustrating a functional block diagram of a crack detection unit disposed in the rolling roll in a second embodiment of the present invention.

Hereinafter, an online crack detection device for a rolling roll of a second embodiment of the present invention will be described with reference to FIG. 12. FIG. 12 illustrates a functional block diagram of the crack detection device incorporated in a rolling roll in the second embodiment of the present invention. The crack detection device has the AE sensor 10 detecting the elastic wave that occurs and progresses on the barrel surface of the barrel portion 2 and the calculation unit 11 calculating the feature value of the elastic wave detected by the AE sensor 10. The feature value data of the elastic wave calculated by the calculation unit 11 is transmitted from a communication unit 13 to a server provided with a discrimination unit installed outside the rolling roll. The difference from the first embodiment is that the configuration of a crack detection unit 4 device disposed in the rolling roll is different, the discrimination unit disposed in the rolling roll in the first embodiment is disposed outside the rolling roll, and the elastic wave attributable to a crack occurring and progressing in the barrel surface is discriminated by the discrimination unit disposed outside the rolling roll in this configuration. In addition, the power source unit 14 is electrically connected to each of the AE sensor 10, the calculation unit 11, and the communication unit 13 and supplies electric power. The discrimination unit provided in a server discriminates the elastic wave of the crack, accumulates the count number of the elastic waves of the discriminated crack, and appropriately gives an instruction to stop rolling and maintain the rolling roll.

As described in the first embodiment, the discrimination unit provided in the server is not particularly limited insofar as the discrimination unit has a calculation function to accumulate the feature value data of the detected elastic wave and compare the rise time and detection time of the feature value data. A microcomputer or the like can be applied as the discrimination unit.

The online crack detection device for a rolling roll in the first embodiment and those similar to those disposed in the rolling roll provided therein can be used as the online crack detection device for a rolling roll in the second embodiment and the AE sensor, the calculation unit, the communication unit, and the power source unit disposed in the rolling roll provided therein. The calculation unit calculates the feature value of the elastic wave detected by the AE sensor, the communication unit transmits the feature value of the elastic wave to the discrimination unit disposed outside the rolling roll, and the power source unit is for electric power supply to the AE sensor, the calculation unit, and the communication unit.

According to the online crack detection device for a rolling roll, the rolling roll, and the online crack detection method for a rolling roll in the second embodiment of the present invention, a crack that occurs and propagation in the surface of the barrel portion of the rolling roll can be discriminated online as in the first embodiment. As a result, the rolling process is appropriately stopped, the rolling roll in which a crack occurred is removed from the rolling device, the rolling roll is replaced with an uncracked sound rolling roll, and the rolling process is resumed. The cracked rolling roll is repaired by offline barrel surface removal grinding. As a result, roll breakage attributable to spalling can be forestalled. In addition, a crack in a state where the crack did not significantly propagate can be grasped, and thus grinding amount and repair cost reduction can be achieved.

Third Embodiment

Figure 9B:
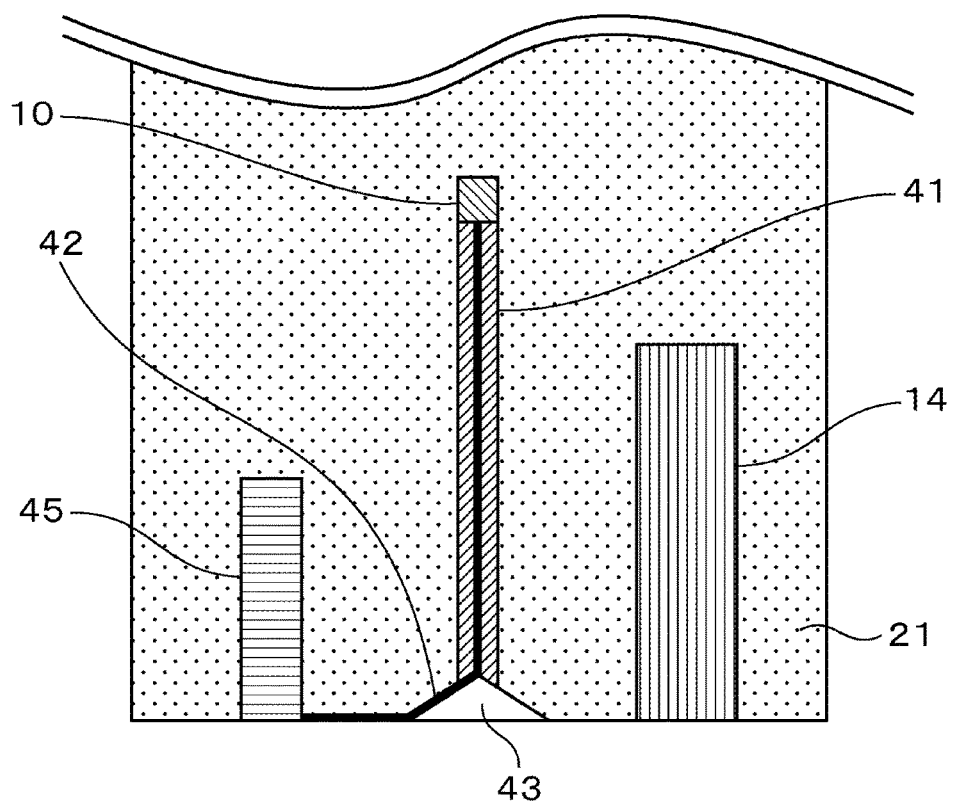

The first embodiment described with reference to FIGS. 9A and 9B is an example in which a lithium-ion secondary battery is used for the power source unit disposed in the shaft portion end portion of the rolling roll. Alternatively, a power source outside the rolling roll may supply electric power to the AE sensor, the calculation unit, the discrimination unit, and the communication unit insofar as a mechanism supplying electric power to the shaft portion of the rolling roll can be provided in and near the rolling device. Specific power supply methods include contact power supply by means of a slip ring or the like, magnetic field coupling-type non-contact power supply, electric field coupling-type non-contact power supply, radio wave-type non-contact power supply, and laser-type non-contact power supply. In addition, an independent power source based on energy harvesting may be combined. Applicable as a specific example of the energy harvesting is piezoelectric power generation using pressure or friction between the rolling roll and the bearing, triboelectric power generation, electromagnetic induction power generation, temperature difference power generation, or a combination thereof.

FIGS. 10A and 10B are examples illustrating the mounting form of an online crack detection device for a rolling roll in a third embodiment of the present invention and a rolling roll provided therein. In the online crack detection device for a rolling roll, a power receiving unit incorporating a power receiving coil disposed on the outer periphery of the shaft portion of the rolling roll and a power transmission unit incorporating a power transmission coil disposed so as to face the power receiving unit are magnetically coupled and non-contact power supply is performed to the power receiving unit via the power transmission unit from a power source unit disposed outside the rolling roll. FIG. 10A is an end view and FIG. 10B is an axial A-A' cross-sectional view of the end surface of the shaft portion of the rolling roll. The configuration and disposition of the AE sensor 10 and the calculation device 45 incorporating the discrimination unit, the communication unit, and the calculation unit are the same as in FIGS. 9A and 9B, and the present embodiment is characterized by the configuration of the power source unit. A power source unit 46 was disposed in a ring shape on the circumference of the shaft portion of the rolling roll. The power source unit 46 incorporates a magnetic field coupling-type power receiving unit, specifically, a power receiving coil wound in the circumferential direction of the roll shaft portion and is electrically connected to the calculation device 45 via a connector 47 and wiring 48. An auto coupler that can be easily attached and detached can be used for the connector 47.

Figure 11A:
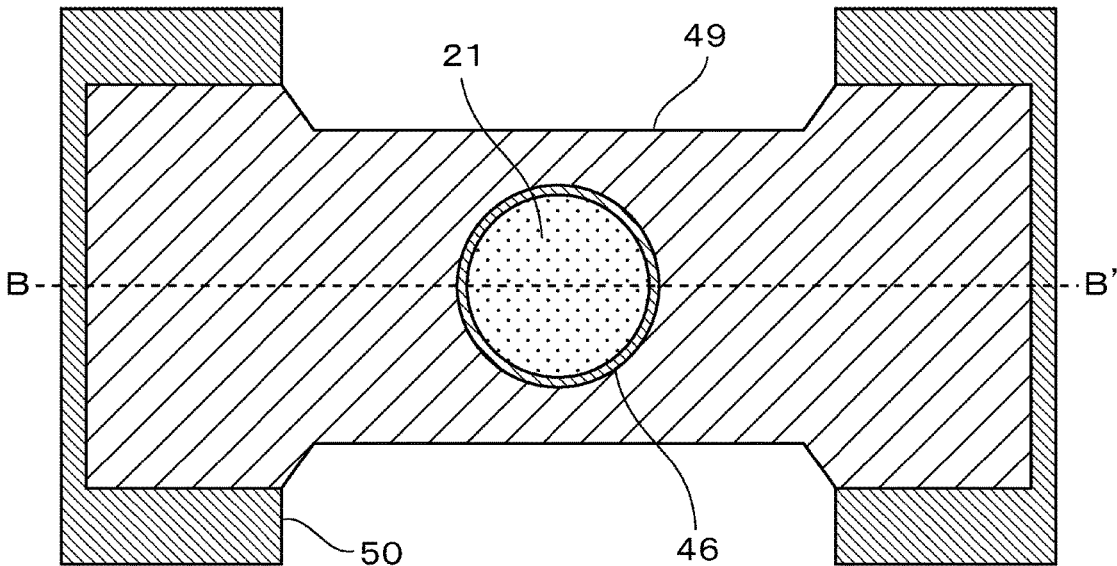
FIGS. 11A and 11B illustrate configuration diagrams in a case where the roll for rolling illustrated in FIGS. 10A and 10B are installed in the rolling device.
Figure 11B:
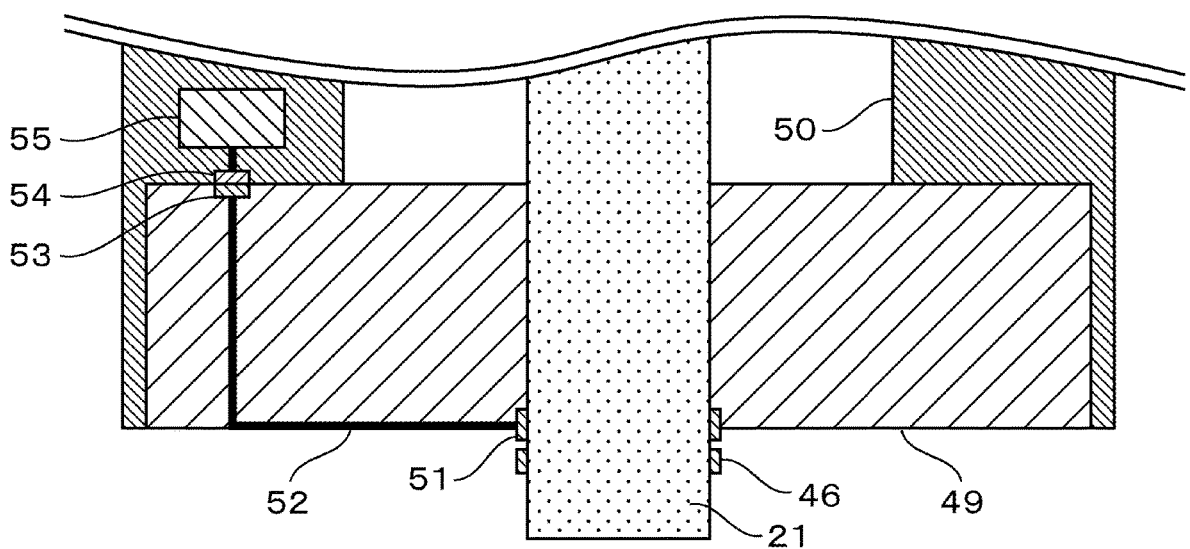

FIG. 11A is a side view and FIG. 11B is an axial B-B' cross-sectional view of a rolling device including the rolling roll in a case where the rolling roll illustrated in FIGS. 10A and 10B is installed in the rolling device. The shaft portion 3 of the rolling roll is installed in a roll chock (box into which a bearing is fitted and which transmits a rolling load received by the bearing to a housing) 49, and the chock 49 is installed on a rolling device housing 50. The roll chock 49 incorporates a magnetic field coupling-type power transmission unit 51, of which coil winding direction is specifically circumferential direction of the roll shaft, at a position facing the power source unit 46 of the rolling roll. The power transmission unit 51 is electrically connected to a rolling device power source unit 55 via wiring 52, a roll chock-side connector 53, and a housing-side connector 54. An auto coupler that can be easily attached and detached can be used for the roll chock-side connector 53 and the housing-side connector 54.

With the configuration illustrated in FIGS. 10A-10B and 11A-11B, it is possible to perform non-contact power supply, by a magnetic field coupling method, to the calculation device 45 installed in a rotating rolling roll. In other words, an electric current is generated in the facing power source unit 46 by the magnetic flux generated by an electric current flowing from the rolling device power source unit 55 to the power transmission unit 51 and electric power can be supplied to the calculation device 45. Although the case of the first embodiment described with reference to FIGS. 9A and 9B is an example in which a lithium-ion secondary battery is used for the power source unit 14 and the battery is consumed and needs to be replaced in the case of rolling work continuation, electric power can be supplied from the outside of the rolling roll by non-contact power supply in the case of the third embodiment, and thus battery replacement is unnecessary and maintenance costs can be reduced.

In the illustrated example, the AE sensor is disposed in one shaft portion of the rolling roll in the online crack detection device for a rolling roll incorporated in the rolling device of the present invention and the rolling roll provided therein. Alternatively, a plurality of AE sensors may be disposed.

For example, AE sensors may be disposed at both ends of one shaft portion and the other shaft portion extending as a unit from both ends of the barrel portion of the rolling roll. This disposition is preferable in that the position of a crack in the axial direction of the rolling roll can be identified from the difference between the times at which the two AE sensors detect elastic waves attributable to the crack. When the position of the crack can be identified, repair can be performed by welding or the like in a case where the depth of the crack is relatively shallow, and thus repair costs can be further reduced.

In addition, a plurality of AE sensors may be disposed in, for example, a circumferential shape in one shaft portion end portion. This disposition is preferable in that the position of a crack in the circumferential direction of the rolling roll can be identified from the difference between the times at which the AE sensors detect elastic waves attributable to the crack or a feature value of an elastic wave. When the position of the crack can be identified, repair can be performed by welding or the like in a case where the depth of the crack is relatively shallow, and thus repair costs can be further reduced.

Although embodiments of the present invention have been described by means of the rolling roll having the composite structure including the outer and inner layers, the online crack detection device for a rolling roll and the rolling roll of the present invention are applicable to a single rolling roll according to the detection principle.

REFERENCE SIGNS LIST

1 Roll for rolling
2 Barrel portion
3 Shaft portion
4 Outer layer
5 Inner layer
6 Crack detection unit
10 AE sensor
11 Calculation unit
12 Discrimination unit
13 Communication unit
14 Power source unit
15 Information transmission path
16 Power supply path
20 Digital signal waveform
21 Amplitude
22 Rise time
23 Threshold value
24 Duration
25 AE energy
26 Count number
27 Detection time
31 Steep change point of load current
32 Elastic wave during steel sheet biting
41 Pressing jig
42 Wiring
43 Center hole
44 Center hole member
45 Calculation device incorporating discrimination unit and communication unit
46 Power source unit incorporating power receiving unit
47 Connector
48 Wiring
49 Roll chock
50 Rolling device housing
51 Power transmission unit
52 Wiring
53 Chock-side connector
54 Housing-side connector
55 Rolling device power source unit

The invention claimed is:

1. An online crack detection device for a rolling roll incorporated in a rolling device, the rolling roll of a barrel portion and shaft portions extending as a unit from both ends of a body portion, the device comprising:
an AE sensor detecting elastic waves generated on a surface of the barrel portion;
a calculation unit calculating a feature value of the elastic waves detected by the AE sensor; and
a discrimination unit discriminating, from the feature value, elastic waves attributable to a crack occurring in the body portion surface; and
wherein
the calculation unit receives the elastic waves generated in the barrel portion of the rolling roll with the AE sensor as voltage signals,
filtered signals are generated by unnecessary frequencies being removed by filtering of the voltage signals, and the filtered signals are converted into a digital signals after quantization, the feature value of the elastic waves are calculated from the digital signals, and the discrimination unit discriminates the elastic waves attributable to the crack occurring in the barrel surface by removing, based on the feature value of the elastic waves calculated by the calculation unit, elastic waves attributable to friction between the rolling roll and a steel sheet at a time when the rolling roll rolls the steel sheet and elastic waves at a time when the rolling roll bites the steel sheet.

2. The online crack detection device for a rolling roll according to claim 1, wherein elastic waves with rise time of 20 μsec or more are removed as the elastic waves attributable to the friction between the rolling roll and the steel sheet, the rise time being the feature value of the elastic waves.

3. The online crack detection device for a rolling roll according to claim 1, wherein time at a time of steel sheet biting is identified from time-series data of a load current applied to the rolling device and a detection time-synchronized elastic waves are removed as the elastic waves at the time of steel sheet biting.

4. The online crack detection device for a rolling roll according to claim 1, wherein elastic waves having the same cycle as a rotation cycle of the rolling roll are discriminated as the elastic waves generated by the crack in the barrel surface.

5. The online crack detection device for a rolling roll according to claim 1, comprising a communication unit transmitting information resulting from the discrimination.

6. The online crack detection device for a rolling roll according to claim 5, comprising a power source unit for supplying electric power to the communication unit.

7. A rolling roll provided in the online crack detection device for a roll for rolling according to claim 1, wherein the AE sensor is disposed in at least one of the shaft portions of the rolling roll.

8. The rolling roll according to claim 7, wherein the calculation unit is disposed in at least one of the shaft portions of the rolling roll.

9. The rolling roll according to claim 8, wherein a communication unit transmitting the feature value of the elastic wave calculated by the calculation unit to an outside of the rolling roll is disposed in at least one of the shaft portions of the rolling roll.

10. The rolling roll according to claim 8, wherein a discrimination unit discriminating the elastic waves attributable to the crack from the feature value of the elastic waves calculated by the calculation unit and a communication unit transmitting information resulting from the discrimination to an outside of the rolling roll are disposed in at least one of the shaft portions of the rolling roll.

11. The rolling roll according to claim 9, wherein a power source unit for supplying electric power to the AE sensor, the calculation unit, and the communication unit or the AE sensor, the calculation unit, the discrimination unit, and the communication unit is disposed in at least one of the shaft portions of the rolling roll.

12. The rolling roll according to claim 9, wherein a recess portion for disposing the AE sensor, the calculation unit, the communication unit, and a power source unit or the AE sensor, the calculation unit, the communication unit, the discrimination unit, and the power source unit is provided in an end portion of the shaft portion.

13. The rolling roll according to claim 9, wherein an acceleration sensor detecting a number of rotations of the rolling roll is disposed in the rolling roll.

14. The online crack detection device for a rolling roll according to claim 6, wherein the power source unit is disposed outside the rolling roll.

15. The online crack detection device for a rolling roll according to claim 14, wherein a power receiving unit incorporating a power receiving coil disposed on an outer periphery of the shaft portion of the rolling roll and a power transmission unit incorporating a power transmission coil disposed so as to face the power receiving unit are magnetically coupled and non-contact power supply is performed to the power receiving unit via the power transmission unit from the power source unit disposed outside the rolling roll.

16. An online crack detection method for a rolling roll, the method comprising:

detecting, with an AE sensor, an elastic wave generated on a surface of a barrel portion of a rolling roll having the barrel portion and shaft portions extending as a unit from both ends of the barrel portion;

calculating a feature value of the elastic waves detected by the AE sensor; and discriminating, from the feature value, elastic waves attributable to a crack occurring in the barrel surface and wherein the elastic waves generated in the barrel portion of the rolling roll are received as voltage signals by the AE sensor, filtered signals are generated by unnecessary frequencies being removed by filtering of the voltage signals, the filtered signals are converted into digital signals after quantization, the feature value of the elastic waves is calculated from the digital signals, and the elastic waves attributable to the crack occurring in the barrel surface is discriminated by elastic waves attributable to friction between the rolling roll and a steel sheet at a time when the rolling roll rolls the steel sheet and elastic waves at a time when the rolling roll bites the steel sheet being removed based on the feature value of the elastic waves.

\* \* \* \* \*